US012731489B2

(12) United States Patent
Zhou et al.

(10) Patent No.: US 12,731,489 B2
(45) Date of Patent: Sep. 8, 2026

(54) VEHICLE REMINDING METHOD AND SYSTEM, AND RELATED DEVICE

(71) Applicant: Yinwang Intelligent Technologies Co., Ltd., Shenzhen (CN)

(72) Inventors: Wei Zhou, Shanghai (CN); Bingxue Wang, Shanghai (CN); Cunlian Wang, Shanghai (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 310 days.

(21) Appl. No.: 18/182,603

(22) Filed: Mar. 13, 2023

(65) Prior Publication Data

US 2023/0222914 A1 Jul. 13, 2023

Related U.S. Application Data

(63) Continuation of application No. PCT/CN2021/117466, filed on Sep. 9, 2021.

(30) Foreign Application Priority Data

Sep. 14, 2020 (CN) ........................ 202010964311.5

(51) Int. Cl.
*G08G 1/16* (2006.01)
*B60Q 9/00* (2006.01)
*H04W 4/46* (2018.01)

(52) U.S. Cl.
CPC ............ *G08G 1/161* (2013.01); *B60Q 9/008* (2013.01); *G08G 1/166* (2013.01); *H04W 4/46* (2018.02)

(58) Field of Classification Search
CPC G08G 5/21; G08G 5/34; G08G 1/161; G08G 1/166; H04W 4/46; B60Q 9/008
USPC .......................................................... 701/301
See application file for complete search history.

(56) References Cited

U.S. PATENT DOCUMENTS 5,091,726 A * 2/1992 Shyu ...................... B60Q 1/535 701/96
8,190,345 B1 * 5/2012 Panzarella ............ B60T 13/745 701/45
9,656,606 B1 * 5/2017 Vose ....................... G01S 19/42
10,007,269 B1 * 6/2018 Gray ................... G06F 18/2178
2005/0275514 A1 * 12/2005 Roberts .................... B60Q 5/00 340/436
2006/0097570 A1 5/2006 Doerr et al.
2010/0250106 A1 * 9/2010 Bai .................. G08G 1/096791 701/117

(Continued)

FOREIGN PATENT DOCUMENTS

CN 105291965 A 2/2016
CN 106004655 A 10/2016

(Continued)

*Primary Examiner* — Rachid Bendidi
(74) *Attorney, Agent, or Firm* — WOMBLE BOND DICKINSON (US) LLP

(57) ABSTRACT

A vehicle reminding method and system, and a related device are provided. The method includes: obtaining detection information, where the detection information includes related information that is of a target vehicle and that is collected by a sensor of an ego vehicle; performing collision analysis based on the detection information; and reminding the target vehicle of a collision risk.

9 Claims, 9 Drawing Sheets

(56) References Cited

U.S. PATENT DOCUMENTS

| | | | | |
|---|---|---|---|---|
| 2014/0009307 | A1 * | 1/2014 | Bowers | G08G 1/166<br>340/901 |
| 2016/0358466 | A1 * | 12/2016 | Youngblood | G08G 1/096741 |
| 2023/0059897 | A1 * | 2/2023 | Miucic | H04W 4/44 |

FOREIGN PATENT DOCUMENTS

| | | | | | |
|---|---|---|---|---|---|
| CN | 106157696 | A | | 11/2016 | |
| CN | 106314433 | A | | 1/2017 | |
| CN | 107010028 | A | | 8/2017 | |
| CN | 111179624 | A | | 5/2020 | |
| CN | 111923858 | A | | 11/2020 | |
| CN | 112265496 | A | | 1/2021 | |
| CN | 112966613 | A | | 6/2021 | |
| CN | 113386738 | A | | 9/2021 | |
| CN | 114582132 | A | * | 6/2022 | |
| JP | 2001338377 | A | * | 12/2001 | B60R 21/01562 |
| JP | 2008181200 | A | | 8/2008 | |
| KR | 20120052479 | A | | 5/2012 | |
| KR | 20190105308 | A | | 9/2019 | |
| WO | 2019239402 | A1 | | 12/2019 | |

* cited by examiner

210
Sensor module
2110
2120
Internal sensing module
External sensing module

VEHICLE REMINDING METHOD AND SYSTEM, AND RELATED DEVICE

CROSS-REFERENCE TO RELATED APPLICATIONS

This application is a continuation of International Application No. PCT/CN2021/117466, filed on Sep. 9, 2021, which claims priority to Chinese Patent Application No. 202010964311.5, filed on Sep. 14, 2020. The disclosures of the aforementioned applications are hereby incorporated by reference in their entireties.

TECHNICAL FIELD

This application relates to the field of traffic safety, and in particular, to a vehicle reminding method and system, and a related device.

BACKGROUND

Currently, more and more in-depth research on intelligent driving modes such as autonomous driving and assisted driving is carried out. Under support of a conventional intelligent driving technology, a vehicle may sense an ambient environment, detect and classify the ambient environment by using various sensors, and transmit information to a planning and control module. Then, a decision on a future driving path of the vehicle is formed and finally executed by an actuator. However, in this process, once an emergency occurs, for example, a vehicle ahead decelerates sharply or a vehicle ahead cuts in at a short distance, a driver usually needs to take over some braking processing, or directly trigger safety functions such as automatic emergency braking (AEB). As a result, a collision usually cannot be avoided in time, and even a greater safety risk is caused by emergency braking.

Therefore, how to effectively reduce a potential safety hazard caused by insufficient braking or random braking of an ego vehicle when an emergency occurs is an urgent problem to be resolved.

SUMMARY

This application provides a vehicle reminding method and system, and a related device, so that an ego vehicle can remind a target vehicle after predetermining a collision risk, to reduce a possible collision risk due to an improper driving behavior of the target vehicle, such as short-range cutting-in, and avoid a potential safety hazard caused by insufficient braking of the ego vehicle. In addition, a greater safety risk that may be caused by excessive braking of the ego vehicle due to an improper driving behavior of the target vehicle is reduced, so that a driving process of the vehicle is safer.

According to a first aspect, this application provides a vehicle reminding method. The method includes: obtaining detection information, where the detection information includes related information that is of a target vehicle and that is collected by a sensor; performing collision analysis based on the detection information; and reminding the target vehicle when it is determined that there is a collision risk.

According to the method provided in the first aspect, it can be learned that, based on daily driving experience, in a driving process, if emergencies occur, for example, a vehicle ahead decelerates sharply, braking adopted by an ego vehicle is very limited, and a time period for taking a measure is also very short. Therefore, in an event of these emergencies, a braking treatment of a single vehicle alone is often impossible to avoid the risk. Therefore, if an emergency occurs, such as rapid deceleration of the vehicle ahead, the ego vehicle first performs collision analysis to predict whether a collision may occur, so that the ego vehicle can have enough reaction and processing time. Then, the ego vehicle performs a specific braking treatment immediately after the ego vehicle learns that a collision may occur, and at the same time, the ego vehicle reminds the target vehicle to take a corresponding measure. In this way, a possible collision risk caused by an emergency can be reduced, a potential safety hazard caused by insufficient braking of the ego vehicle is reduced, and a greater safety risk that may be caused by excessive braking of the ego vehicle due to the emergency is further reduced.

With reference to the first aspect, in an embodiment, the detection information further includes related information that is of the ego vehicle and that is collected by the sensor.

In an embodiment, the ego vehicle further needs to obtain the related information of the ego vehicle, including a speed of the ego vehicle and an acceleration of the ego vehicle, to clearly learn a driving status of the ego vehicle, and avoid a case in which there is no sufficient information to respond to an emergency when the emergency occurs.

With reference to the first aspect, in an embodiment, the related information of the target vehicle includes an acceleration value of the target vehicle, and before performing collision analysis based on the detection information, the method further includes: determining whether the acceleration value of the target vehicle is less than a first threshold; and performing collision analysis based on the related information of the target vehicle when the acceleration value of the target vehicle is less than the first threshold.

In an embodiment, the ego vehicle obtains the related information of the target vehicle, including the acceleration of the target vehicle, and determines whether the acceleration is less than the first threshold, to determine whether the ego vehicle performs collision analysis. It may be understood that the ego vehicle needs to obtain effective information immediately after the emergency occurs. Therefore, once it is determined that the acceleration is less than the first threshold, the ego vehicle immediately performs collision analysis. The ego vehicle can have more time to perform braking and reminding in an acceleration predetermining manner. In addition, it may be understood that the first threshold is set by research and development personnel according to an actual situation.

With reference to the first aspect, in an embodiment, the performing collision analysis based on the detection information includes: performing collision analysis based on the detection information to determine a collision risk level, where the collision risk level includes a low risk, a medium risk, and a high risk.

In an embodiment, after the ego vehicle performs collision analysis, the ego vehicle classifies the collision risk level based on a collision hazard degree, so that the ego vehicle can accurately inform the target vehicle of the risk in a subsequent process. After the ego vehicle classifies the collision risk level, the ego vehicle can determine the braking treatment to be performed by the ego vehicle and a reminding mode to be used for the vehicle ahead based on the collision risk level. In this way, the ego vehicle can make a better response, and may further transmit more accurate information to the target vehicle, so that the target vehicle can try to take a measure to avoid collision while ensuring safety of the ego vehicle.

With reference to the first aspect, in an embodiment, the reminding the target vehicle when it is determined that there is a collision risk includes: reminding the target vehicle by controlling a sound and/or light when the collision risk level is determined.

In an embodiment, when it is determined that there is a collision risk, different sounds and/or types of light may be used to remind the target vehicle based on different collision risk levels, so that the target vehicle can obtain more information and take a corresponding measure. For example, in a high-risk situation, the target vehicle can determine that a current collision risk is particularly high based on sound and/or light information transmitted by the ego vehicle, and the collision may be unavoidable at this moment, and even if the target vehicle brakes immediately, it may not be helpful. Then a driver of the target vehicle can take more measures to ensure safety of the driver while performing braking processing.

With reference to the first aspect, in an embodiment, the reminding the target vehicle when it is determined that there is a collision risk includes: sending a V2X message to the target vehicle to remind the target vehicle when the collision risk level is determined.

In an embodiment, when it is determined that there is a collision risk, the V2X message may be directly sent to the target vehicle to remind the target vehicle to be careful of a vehicle collision risk. The V2X message may include the collision risk level, so that the target vehicle can know the current collision risk level, and the target vehicle performs braking processing based on different risk levels.

According to a second aspect, a vehicle reminding apparatus is provided, including a sensor module, a fusion control module, and a reminding module. The sensor module is configured to obtain detection information, where the detection information includes related information that is of a target vehicle and that is collected by a sensor; the fusion control module is configured to: process the detection information, perform collision analysis, and make a control decision; and the reminding module is configured to remind the target vehicle based on the control decision.

With reference to the second aspect, in an embodiment, the sensor module is further configured to obtain related information of an ego vehicle.

With reference to the second aspect, in an embodiment, the sensor module is further configured to: determine whether an acceleration value of the target vehicle is less than a first threshold before the fusion control module performs collision analysis; and perform, by the fusion control module, collision analysis based on the related information of the target vehicle when the acceleration value of the target vehicle is less than the first threshold.

With reference to the second aspect, in an embodiment, the fusion control module is further configured to: determine a collision risk level after performing collision analysis, where the collision risk level includes a low risk, a medium risk, and a high risk.

With reference to the second aspect, in an embodiment, the reminding module is configured to: remind the target vehicle by controlling a sound and/or light when the collision risk level is determined.

With reference to the second aspect, in an embodiment, the reminding module is configured to: send a V2X message to the target vehicle to remind the target vehicle when the collision risk level is determined.

According to a third aspect, a vehicle reminding apparatus is provided, including a receiving unit, a processing unit, and a control unit. The receiving unit is configured to receive detection information, where the detection information includes related information that is of a target vehicle and that is collected by a sensor; the processing unit is configured to: process the detection information, perform collision analysis based on the detection information, and make a control decision; and the control unit is configured to remind the target vehicle based on the control decision.

With reference to the third aspect, in an embodiment, the receiving unit is further configured to receive related information of an ego vehicle.

With reference to the third aspect, in an embodiment, the processing unit is further configured to: determine whether an acceleration value of the target vehicle is less than a first threshold before performing collision analysis; and perform collision analysis based on the related information of the target vehicle when the acceleration value of the target vehicle is less than the first threshold.

With reference to the third aspect, in an embodiment, the processing unit is further configured to: determine a collision risk level after performing collision analysis, where the collision risk level includes a low risk, a medium risk, and a high risk.

With reference to the third aspect, in an embodiment, the control unit is configured to: remind the target vehicle by controlling a sound and/or light when the collision risk level is determined.

With reference to the third aspect, in an embodiment, the control unit is configured to: send a V2X message to the target vehicle to remind the target vehicle when the collision risk level is determined.

According to a fourth aspect, a computing device is provided. The computing device includes a processor, and the processor is configured to support an electronic device in implementing corresponding functions in the vehicle reminding method provided in the first aspect and with reference to any one of the implementations of the first aspect. The computing device may further include a memory. The memory is configured to be coupled to the processor, and the memory stores program instructions and data that are necessary for the electronic device. The computing device may further include a communication interface, configured to perform communication between the computing device and another device or a communication network.

According to a fifth aspect, an intelligent vehicle is provided. The intelligent vehicle includes the computing device according to the fourth aspect, and the computing device is configured to perform the operation operations of the method in the first aspect and with reference to any one of the implementations of the first aspect.

According to a sixth aspect, a computer-readable storage medium is provided. The computer-readable storage medium stores a computer program, and when the computer program is executed by a processor, functions of the vehicle reminding method provided in the first aspect and with reference to any one of the implementations of the first aspect can be implemented.

According to a seventh aspect, this application provides a computer program product. The computer program includes instructions, and when the computer program is executed by a computer, the computer is enabled to perform procedures of the vehicle reminding method provided in the first aspect and with reference to any one of the implementations of the first aspect.

According to an eighth aspect, this application provides a chip system. The chip system includes a processor, configured to support a network device in implementing functions in the first aspect, for example, generating or processing information in the vehicle reminding method in the first aspect. In a possible design, the chip system further includes a memory, and the memory is configured to store program instructions and data that are necessary for a data sending device. The chip system may include a chip, or may include a chip and another discrete component.

DESCRIPTION OF EMBODIMENTS

The following clearly describes technical solutions in embodiments of this application with reference to accompanying drawings. It is clear that the described embodiments are merely some but not all embodiments of this application. All other embodiments obtained by a person of ordinary skill in the art based on embodiments of this application without creative efforts shall fall within the protection scope of this application.

Some terms and related technologies in this application are first described, to facilitate understanding by a person skilled in the art.

A vehicle-to-everything (V2X) system is a communication system dedicated to connecting a vehicle to an ambient environment. Currently, there are two mainstream technologies used for V2X communication in the world. One is dedicated short range communications (DSRC), and the other is a C-V2X (cellular vehicle to everything) technology based on a cellular mobile communication system, including LTE-V2X and 5G NR-V2X. V2X is classified into four types based on different connection objects: a vehicle-to-vehicle (V2V) type, a vehicle-to-infrastructure (V2I) type, a vehicle-to-pedestrian (V2P) type, and a vehicle-to-network (V2N) type. The V2V indicates that direct communication may be performed between vehicles. A vehicle is used as a mobile communication terminal, and has a capability of receiving and sending basic vehicle body data.

An adaptive cruise control (ACC) system is developed based on a cruise control system. In addition to a function of the cruise control system, that is, a function of driving at a speed set by a driver, the adaptive cruise control system can also implement a function of maintaining a preset vehicle following distance and automatically accelerating and decelerating as the distance changes. Compared with the cruise control system, the ACC system can help a driver better coordinate a brake and a throttle.

A full-speed adaptive cruise control system is developed from the adaptive cruise control system. Compared with the adaptive cruise, the full-speed adaptive cruise has a larger operating range and can work between 0 km/h to 150 km/h.

A road side unit (RSU) is an apparatus installed on roadsides in an electronic toll collection (ETC) system, and communicates with an on-board unit (OBU) by using a dedicated short range communications (DSRC) technology, to realize vehicle identification and electronic score deduction. The RSU may include a high-gain directional beam-control read/write antenna and a radio frequency controller. The high-gain directional beam-control read/write antenna is a microwave transceiver module that transmits/receives, modulates/demodulates, encodes/decodes, and encrypts/decrypts data signals and data. The radio frequency controller is a module that controls data transmission and reception and receives information from an upper computer or sends information to an upper computer.

Figure 1A:
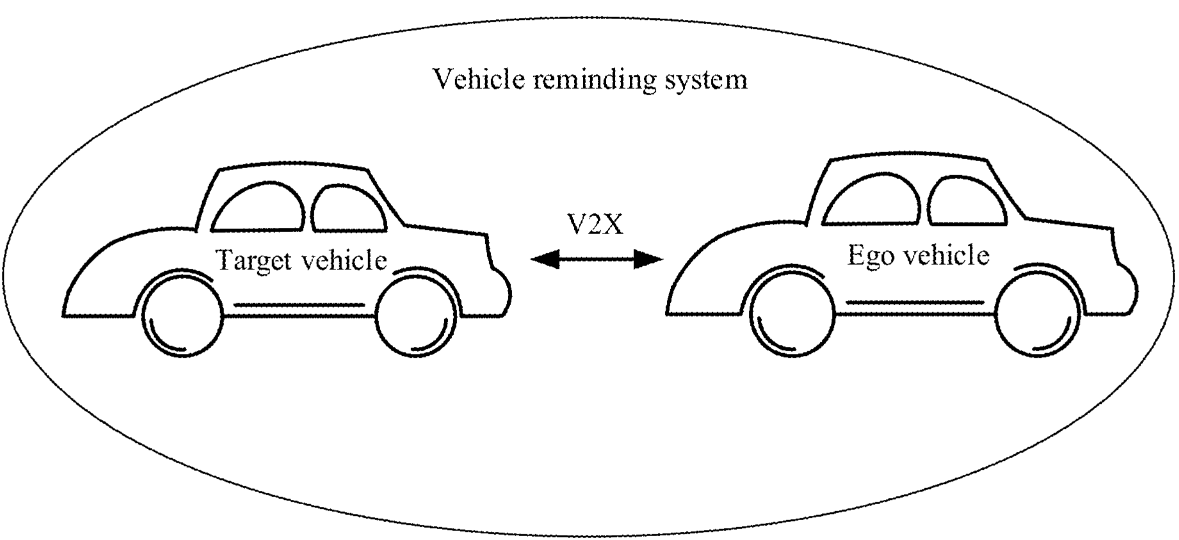
FIG. 1A is a schematic diagram of a structure of a vehicle reminding system architecture according to an embodiment of this application.
Figure 1B:
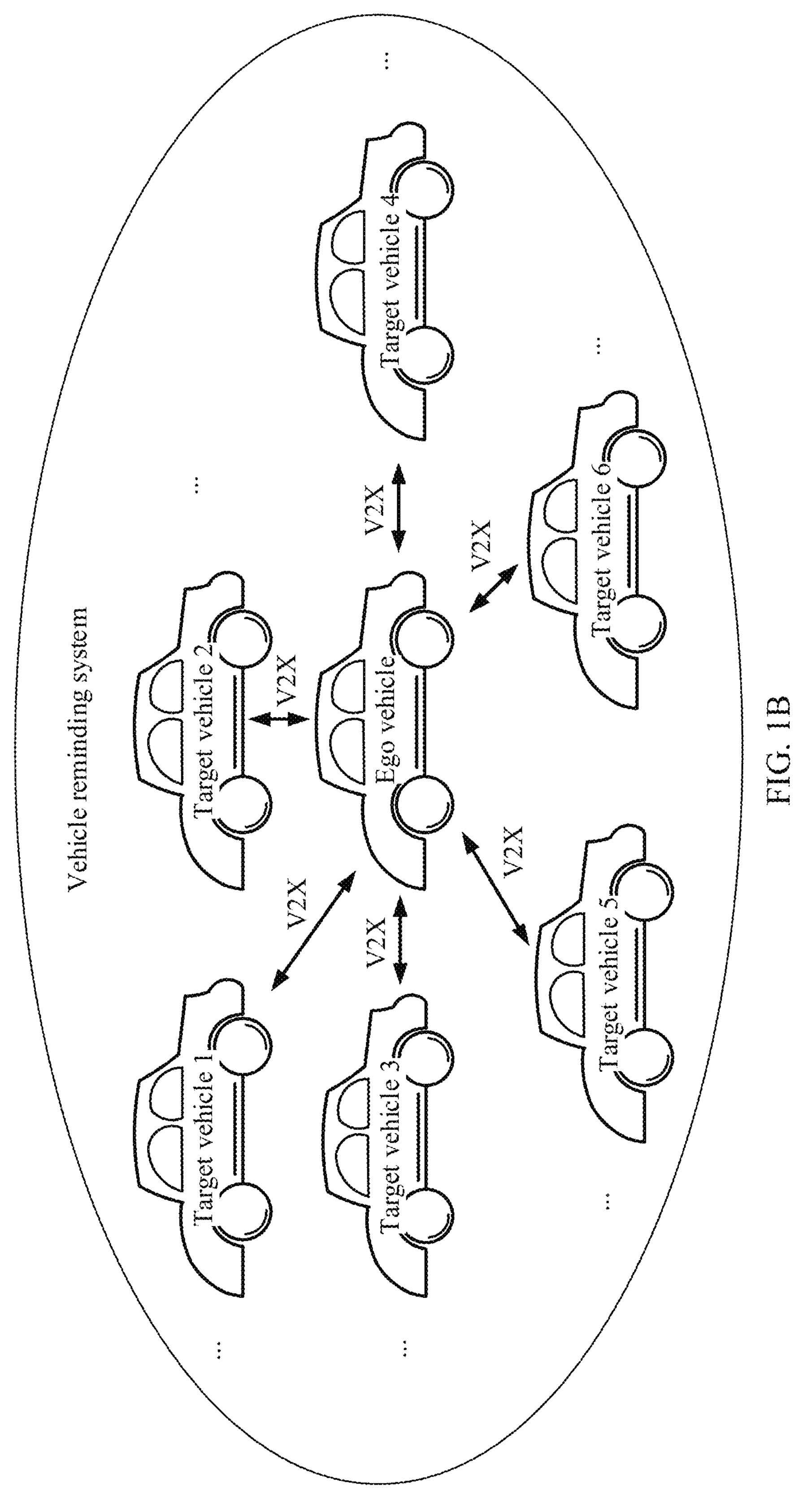
FIG. 1B is a schematic diagram of a structure of another vehicle reminding system architecture according to an embodiment of this application.

To facilitate understanding of embodiments of this application, the following first describes a vehicle reminding system architecture on which embodiments of this application are based. FIG. 1A is a schematic diagram of a vehicle reminding system architecture according to an embodiment of this application. The vehicle reminding system architecture in this application may include one target vehicle, and an ego vehicle and the target vehicle are in a same lane. The ego vehicle and the target vehicle may communicate with each other by using V2X. Specifically, the ego vehicle may directly send a V2X message to the target vehicle, or may transmit a message to the target vehicle by using an RSU. In addition, FIG. 1B is a schematic diagram of another vehicle reminding system architecture according to an embodiment of this application. The vehicle reminding system architecture in this application may include a plurality of target vehicles in a plurality of lanes. An ego vehicle may communicate with the plurality of target vehicles by using V2X. Specifically, the ego vehicle may directly send a V2X message to the target vehicle, or may transmit a message to the target vehicle by using an RSU.

It should be noted that, in the vehicle reminding system architecture shown in FIG. 1B, a quantity of the target vehicles in the plurality of lanes may be limited by using some methods. For example, a specific quantity of target vehicles is selected based on a relative distance between the target vehicle and the ego vehicle. For another example, the ego vehicle is used as a center of a circle, a specific length is used as a radius, and vehicles in the circle are selected as the target vehicles. For example, the ego vehicle may determine locations of surrounding vehicles by using obtained detection information, obtain relative distances between the ego vehicle and the surrounding vehicles, arrange the relative distances in ascending order, and select top 10 vehicles as the target vehicles.

Figures 2, 3:
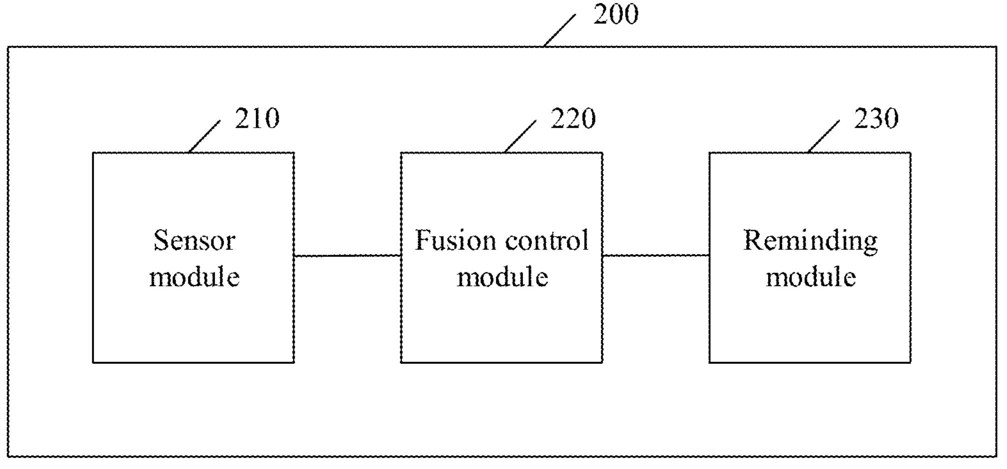
FIG. 2 is a schematic diagram of a structure of a vehicle reminding device according to an embodiment of this application.
FIG. 3 is a schematic diagram of a structure of a sensor module according to an embodiment of this application.

Based on the vehicle reminding system architectures shown in FIG. 1A and FIG. 1B, to better describe the vehicle reminding method provided in this application, a vehicle reminding device provided in an embodiment of this application is first described. Functional unit division of the vehicle reminding device is not limited in this application. Units in the vehicle reminding device may be added, deleted, or combined based on a requirement. FIG. 2 provides an example of functional unit division.

As shown in FIG. 2, FIG. 2 shows a vehicle reminding device according to an embodiment of this application. The vehicle reminding device includes a sensor module 210, a fusion control module 220, and a reminding module 230. Detailed descriptions of each unit are as follows:

The sensor module 210 is configured to obtain detection information, where the detection information includes related information of a target vehicle and related information of an ego vehicle that are collected by a sensor.

The fusion control module 220 is configured to: process the detection information, perform collision analysis, and make a control decision.

The reminding module 230 is configured to remind the target vehicle based on the control decision.

It should be noted that, as shown in FIG. 3, the sensor module 210 includes an internal sensing module 2110 and an external sensing module 2120. The internal sensing module 2110 is configured to obtain the related information of the ego vehicle, where the related information of the ego vehicle includes but is not limited to a speed and an acceleration of the ego vehicle. The external control module 2120 is configured to obtain the related information of the target vehicle, where the related information of the target vehicle includes but is not limited to a speed and an acceleration of the target vehicle, and a relative distance between the target vehicle and the ego vehicle.

It may be understood that the structure of the vehicle reminding device in FIG. 2 is merely an example implementation in this embodiment of this application. The structure of the vehicle reminding device in this embodiment of this application includes but is not limited to the foregoing structure.

Figure 4:
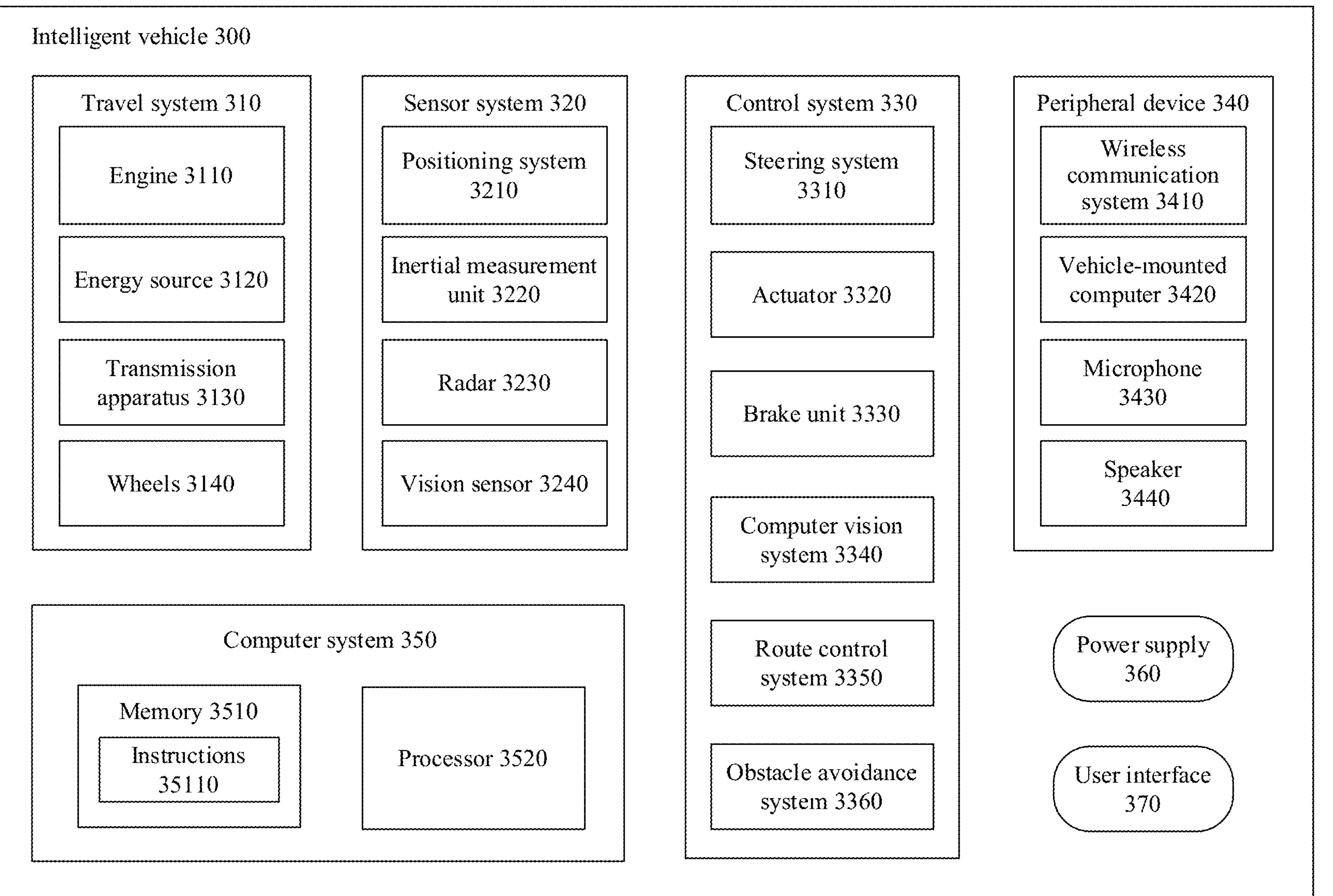
FIG. 4 is a schematic diagram of a structure of an intelligent vehicle according to an embodiment of this application.

Based on the foregoing vehicle driving control system architecture, an embodiment of this application provides an intelligent vehicle 300 applied to the foregoing vehicle reminding system architecture. FIG. 4 is a schematic diagram of a structure of an intelligent vehicle 300 according to an embodiment of this application.

It should be noted that the intelligent vehicle 300 may be set to a fully intelligent driving mode, or may be set to a partially intelligent driving mode. It may be understood that, when the intelligent vehicle 300 is set to the fully intelligent driving mode, the intelligent vehicle 300 may perform a corresponding operation without interacting with a person. The operation includes but is not limited to acceleration, deceleration, and vehicle-following. When the intelligent vehicle is set to the partial intelligent driving mode, the intelligent vehicle 300 may automatically perform a corresponding operation, and a driver may further perform a corresponding operation on the intelligent vehicle, for example, determining a vehicle and an ambient environment of the vehicle, determining a possible behavior of at least one another vehicle in the ambient environment, and determining a confidence level corresponding to a possibility of performing the possible behavior by the another vehicle. Then, the driver controls the intelligent vehicle 300 based on the determined information.

The intelligent vehicle 300 may include various subsystems, for example, a travel system 310, a sensor system 320, a control system 330, one or more peripheral devices 340, a computer system 350, a power supply 360, and a user interface 370. Optionally, the intelligent vehicle 300 may include more or fewer subsystems, and each subsystem may include a plurality of elements. In addition, each of the subsystems and elements of the intelligent vehicle 300 may be interconnected in a plurality of ways, for example, may be interconnected in a wired or wireless manner.

The travel system 310 may include a component providing power to the intelligent vehicle 300. In an embodiment, the travel system 310 may include an engine 3110, an energy source 3120, a transmission apparatus 3130, and wheels/tires 3140. The engine 3110 may be an internal combustion engine, an electric motor, an air compression engine, or a combination of other types of engines, for example, a hybrid engine including a gasoline engine and an electric motor, or a hybrid engine including an internal combustion engine and an air compression engine. The engine 3110 converts the energy source 3120 into mechanical energy.

Examples of the energy source 3120 include gasoline, diesel, another oil-based fuel, propane, another compressed gas-based fuel, ethanol, a solar panel, a battery, and another power source. The energy source 3120 may also provide energy to another system of the intelligent vehicle 300.

The transmission apparatus 3130 may transmit mechanical power from the engine 3110 to the wheels 3140. The transmission apparatus 3130 may include a gearbox, a differential, and a drive shaft. In an embodiment, the transmission apparatus 3130 may further include another component, for example, a clutch. The drive shaft may include one or more shafts that may be coupled to one or more wheels 3140.

The sensor system 320 may include several sensors that can sense information about an ambient environment of the intelligent vehicle 300 and obtain information of the ego vehicle. For example, the sensor system 320 may include a positioning system 3210, an inertial measurement unit (IMU) 3220, a radar 3230, and a vision sensor 3240. The positioning system 3210 may include a GPS system, a BeiDou system, or another positioning system. The sensor system 320 may further include a sensor of an internal system of the monitored intelligent vehicle 300, for example, an in-vehicle air quality monitor, a fuel gauge, or an engine oil thermometer. Data obtained by these sensors can be used to detect an object and corresponding features of the object. The features include but are not limited to a location, a shape, a direction, and a speed. Such detection and recognition are significant for the intelligent vehicle 300 to safely perform subsequent operations.

The positioning system 3210 may be configured to determine a geographic location of the intelligent vehicle 300.

The IMU 3220 can sense a location and an orientation change of the intelligent vehicle 300 based on an inertial acceleration. In an embodiment, the IMU 3220 may be a combination of an accelerometer and a gyroscope. In this case, the IMU 3220 may be configured to measure a curvature of the intelligent vehicle 300.

The radar 3230 may sense an ambient environment of the intelligent vehicle 300 by using a wireless signal, and the ambient environment includes but is not limited to surrounding vehicles, infrastructure, and pedestrians. It may be understood that the radar 3230 may include but is not limited to a millimeter-wave radar and a lidar. In some embodiments, in addition to sensing the ambient environment, the radar 3230 may also be used to sense a motion status of an object in the environment.

The vision sensor 3240 may be configured to capture a plurality of images of the ambient environment of the intelligent vehicle 300. The vision sensor 3240 may include but is not limited to a static camera and a video camera.

The control system 330 may be configured to control operations of the intelligent vehicle 300 and components of the intelligent vehicle 300. The control system 330 may include a plurality of elements. In an embodiment, the control system 330 includes a steering system 3310, an actuator 3320, a brake unit 3330, a computer vision system 3340, a route control system 3350, and an obstacle avoidance system 3360.

The steering system 3310 may be operated to adjust a moving direction of the intelligent vehicle 300. For example, in an embodiment, the steering system 3310 may include a steering wheel system.

The actuator 3320 may be configured to control the engine 3110 and further control a speed of the intelligent vehicle 300. For example, in an embodiment, the actuator 3320 may include a throttle.

The brake unit 3330 may be configured to control the intelligent vehicle 300 to decelerate. The brake unit 3330 may use friction to reduce a rotational speed of the wheels 3140. In another embodiment, the brake unit 3330 may convert kinetic energy of the wheels 3140 into a current. Alternatively, the brake unit 3330 may adopt another method to reduce the rotational speed of the wheels 3140, to control the speed of the intelligent vehicle 300.

It may be understood that the actuator 3320 and the brake unit 3330 may be combined into one unit module, and the combined unit module may be configured to control the speed of the intelligent vehicle 300. In an embodiment, the combined unit module may include a throttle system and a brake system.

The computer vision system 3340 may be configured to process and analyze an image captured by the vision sensor 3240, to identify an ambient environment of the intelligent vehicle 300, and features and a motion status of an object in the ambient environment. The ambient environment may include a traffic signal, a road boundary, and an obstacle. Features of an object in the ambient environment include but are not limited to a surface optical feature of the object. The motion status includes but is not limited to a stationary state, acceleration, and deceleration. The computer vision system 3340 may use an object recognition algorithm, a structure from motion (SFM) algorithm, video tracking, and another computer vision technology. In some embodiments, the computer vision system 3340 includes an image detection system, a neural network-based processing system, and the like, and may be configured to: draw a map for an environment, track an object, estimate a speed of the object, and the like.

The route control system 3350 is configured to determine a driving route of the intelligent vehicle 300. In some embodiments, the route control system 3350 may combine data from one or more predetermined maps of the positioning system 3210 to determine the driving route of the intelligent vehicle 300.

The obstacle avoidance system 3360 is configured to: identify, evaluate, avoid, or bypass obstacles in the ambient environment. In an embodiment, the obstacle avoidance system 3360 needs to obtain information of the ambient environment by using the radar 3230 and the vision sensor 3240; the computer vision system 3340 is used to analyze the ambient environment and identify potential obstacles; and then the obstacle avoidance system 3360 performs evaluation and avoidance.

It should be noted that the control system 330 may add another component, or may replace and/or reduce the foregoing components.

The intelligent vehicle 300 interacts with an external sensor, another vehicle, another computer system, or a user by using the peripheral device 340. The peripheral device 340 may include but is not limited to a wireless communication system 3410, a vehicle-mounted computer 3420, a microphone 3430, and/or a speaker 3440.

It should be noted that, in some embodiments, the peripheral device 340 may interact with the user of the intelligent vehicle 300. For example, the vehicle-mounted computer 3420 may provide information for the user of the intelligent vehicle 300, and at the same time, the user of the intelligent vehicle 300 may also upload data to the vehicle-mounted computer 3420. It should be understood that the user of the intelligent vehicle 300 may perform operations by using a touchscreen of the vehicle-mounted computer 3420. In addition, the peripheral device 340 may provide a means for the intelligent vehicle 300 to communicate with another device in the vehicle. For example, the microphone 3430 may receive audio from the user of the intelligent vehicle 300. The audio may include voice commands and another audio input. Similarly, the speaker 3440 may output audio to the user of the intelligent vehicle 300.

The wireless communication system 3410 may wirelessly communicate with one or more devices directly or through a communication network. For example, the wireless communication system 3410 may use 3G cellular communication, such as CDMA, EVDO, GSM/GPRS, or 4G cellular communication, such as LTE, or 5G cellular communication. The wireless communication system 3410 may communicate with a wireless local area network (WLAN) by using Wi-Fi. In some embodiments, the wireless communication system 3410 may communicate directly with a device through an infrared link, Bluetooth, or ZigBee. The device may include but is not limited to a vehicle and/or a public facility between roadside stations.

It should be noted that, in this embodiment of this application, the ego vehicle and the target vehicle can communicate with each other by using V2X. Therefore, the wireless communication system 3410 may further include one or more DSRC devices and one or more LTE-V2X devices.

The power supply 360 may supply power to various components of the intelligent vehicle 300. In an embodiment, the power supply 360 may include one or more battery packs, and a battery in the battery pack may be a rechargeable lithium-ion battery or a lead-acid battery. It is understood that in some embodiments, the power supply 360 and the energy source 3120 may be implemented together.

Some or all of functions of the intelligent vehicle 300 are controlled by the computer system 350. The computer system 350 may include one or more processors 3520, the processor 3520 executes instructions 35110, and the instructions 35110 are stored in a non-transient computer-readable medium such as a memory 3510. The computer system 350 may alternatively be a plurality of computing devices that control individual components or subsystems of the intelligent vehicle 300 in a distributed manner.

The processor 3520 may be any conventional processor, for example, a commercially available CPU. Optionally, the processor may be a dedicated device such as an application-specific integrated circuit (ASIC) or another hardware-based processor. Although FIG. 4 functionally illustrates devices such as the processor, the memory, and the computer, a person of ordinary skill in the art should understand that the processor or the computer or the memory may actually include a plurality of processors or computers or memories that may or may not be stored in a same physical housing. For example, the memory may be a hard disk drive or another storage medium located in a housing different from that of the computer. Thus, it is understood that a reference to the processor or the computer includes a reference to a set of processors or computers or memories that may or may not operate in parallel. Different from using a single processor to perform the operations described herein, some components, such as a steering component and a deceleration component, each may include a respective processor that performs only computation related to a component-specific function.

In various aspects described herein, the processor may be located far away from the vehicle and communicate wirelessly with the vehicle. In another aspect, some processes described herein are performed on a processor disposed inside the vehicle, while others are performed by a remote processor, including taking operations necessary for single manipulation.

In some embodiments, the memory 3510 may include the instructions 35110 (for example, program logic), and the instructions 35110 may be executed by the processor 3520 to implement various functions including the foregoing functions of the intelligent vehicle 300. The memory 3510 may further include additional instructions, including instructions for sending send data to, receiving data from, interacting with, and/or controlling one or more of the travel system 310, the sensor system 320, the control system 330, and the peripheral device 340.

In addition to storing instructions 35110, the memory 3510 may further store data, such as a road map, route information, vehicle data such as a location, a direction, and a speed of a vehicle, and other related information. It may be understood that, in an embodiment, when the intelligent vehicle 300 is in an autonomous driving mode, a partially autonomous driving mode, and/or a manual driving mode, the computer system 350 of the intelligent vehicle 300 can perform a related operation by using the data. For example, the computer system 350 of the intelligent vehicle 300 may adjust a current speed of the intelligent vehicle based on road information of a target road section and a received speed range of the target vehicle, to enable the intelligent vehicle to follow the vehicle at a constant speed.

The user interface 370 is used to provide information for or receive information from the user of the intelligent vehicle 300. Optionally, the user interface 370 may include an interface required by one or more input/output devices in the peripheral device 340, for example, a USB interface, an AUX interface, or an OBD interface.

The computer system 350 may control functions of the intelligent vehicle 300 based on data of various subsystems (for example, the travel system 310, the sensor system 320, and the control system 330) and data received from the user interface 370. For example, the computer system 350 may control the steering system 3310 to avoid an obstacle detected by the sensor system 320 and the obstacle avoidance system 3360.

Optionally, the foregoing components may be assembled as subsystems inside the intelligent vehicle 300, and one or more of the foregoing components may be installed separately from the intelligent vehicle 300. For example, the memory 3510 may exist partially or entirely separated from the intelligent vehicle 300. The foregoing components may be coupled in a wired and/or wireless manner.

It should be noted that the foregoing modules and components in the modules may be added, replaced, or deleted based on an actual requirement. This is not limited in this application.

An intelligent driving vehicle traveling on a road, for example, the intelligent vehicle 300 shown in FIG. 4, may identify an ambient environment of the intelligent driving vehicle and adjust a current speed. The ambient environment may include, but is not limited to, other vehicles, pedestrians, traffic control devices, other infrastructure, and other types of objects. In some embodiments, the intelligent driving vehicle may independently consider each identified object, and determine, based on a feature of the object, for example, a speed, an acceleration, and a relative distance from the ego vehicle, a speed to be adjusted by the intelligent driving vehicle.

Optionally, the intelligent vehicle 300 or the computing device associated with the intelligent vehicle 300 (such as the computer system 350, the computer vision system 3340, and the data storage apparatus 3510 in FIG. 4) may predict behavior of an identified object based on features of the identified object and statuses of the ambient environment (for example, traffic, rain, or ice on the road). It may be understood that each identified object is associated, and therefore behavior of a single object may also be predicted by analyzing statuses of all objects in the ambient environment. The intelligent vehicle 300 can adjust the speed of the ego vehicle based on the predicted behavior of the identified object. In other words, the intelligent vehicle 300 can determine, based on the predicted behavior of the object, how the vehicle needs to be adjusted (for example, accelerate, decelerate, or stop) and to what stable state the vehicle needs to be adjusted. During this process, influence of other factors may also be considered, for example, a lateral position of the intelligent vehicle 300 in a road on which the intelligent vehicle 300 is traveling, a curvature of the road, proximity of static and dynamic objects, and the like.

In addition to providing an instruction for adjusting the speed of the intelligent vehicle 300, the computing device may further provide an instruction for modifying a steering angle of the intelligent vehicle 300, so that the autonomous vehicle can follow a given lane and/or maintain safe horizontal and vertical distances from an object (for example, a car in a neighboring lane) near the vehicle.

The intelligent vehicle 300 may be a car, a truck, a motorcycle, a bus, a boat, an airplane, a helicopter, a lawn mower, a recreational vehicle, a playground vehicle, a construction device, a trolley, a golf cart, a train, a handcart, or the like. This is not limited in this embodiment of this application.

It may be understood that the schematic diagram of the structure of the intelligent vehicle shown in FIG. 4 is merely an example implementation in this embodiment of this application. The intelligent vehicle in this embodiment of this application includes but is not limited to the foregoing structure.

Based on the schematic diagrams of vehicle reminding system architectures shown in FIG. 1A and FIG. 1B and the vehicle reminding device shown in FIG. 2, and with reference to the vehicle reminding method provided in this application, the technical problems raised in this application are analyzed and resolved.

Figure 5:
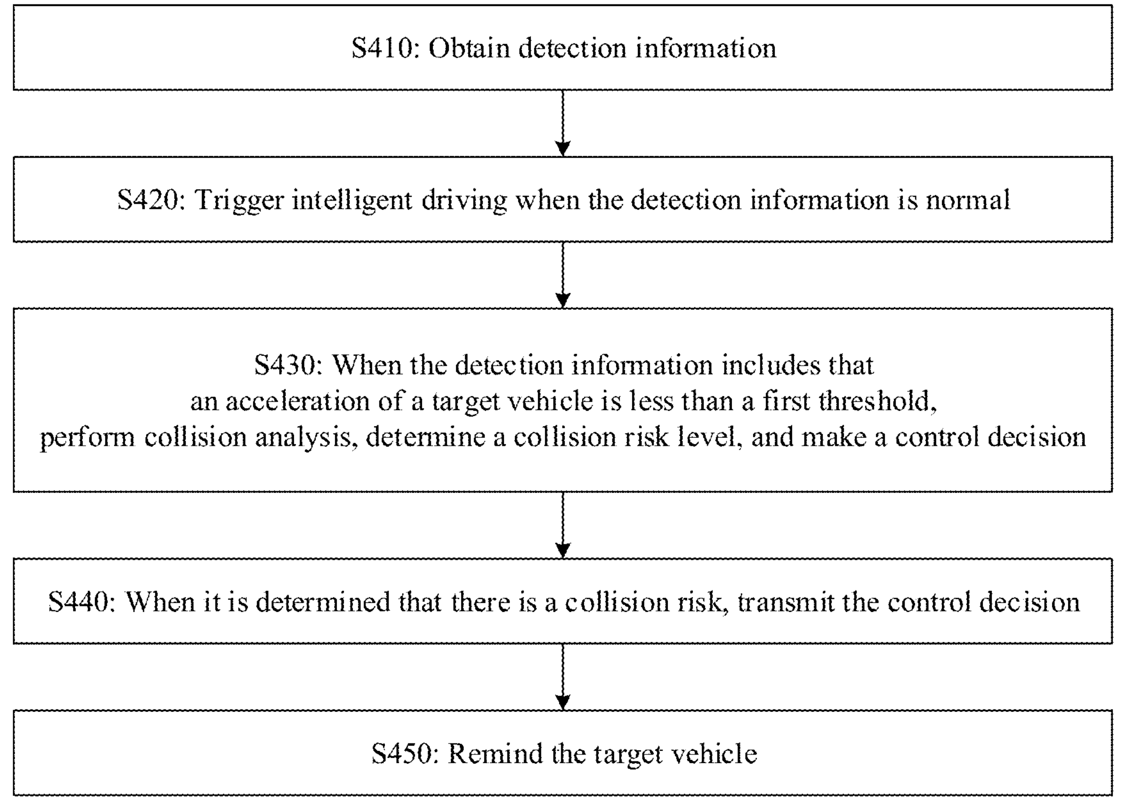
FIG. 5 is a schematic flowchart of a vehicle reminding method according to an embodiment of this application.

FIG. 5 is a schematic flowchart of a vehicle reminding method according to an embodiment of this application. The method may be applied to the vehicle reminding system architectures shown in FIG. 1A and FIG. 1B, the vehicle reminding device shown in FIG. 2, and the intelligent vehicle shown in FIG. 4. The method includes but is not limited to the following operations.

S410: Obtain detection information.

Specifically, an ego vehicle obtains related information of a target vehicle and related information of the ego vehicle. After the ego vehicle is started, the sensor module 210 obtains the detection information of a surrounding vehicle and the detection information of the ego vehicle. The detection information of the surrounding vehicle is obtained by the external sensing module 2120, and the detection information of the surrounding vehicle includes but is not limited to a speed and an acceleration of the surrounding vehicle, a relative distance from the surrounding vehicle to the ego vehicle, and a specific orientation of the surrounding vehicle. The detection information of the ego vehicle is obtained by the internal sensing module 2110, and the detection information of the ego vehicle includes but is not limited to information such as a speed and an acceleration of the ego vehicle.

It should be noted that, obtaining the detection information by the sensor module 210 is a first operation for the ego vehicle to identify, detect, and classify an ambient environment. The sensor module 210 needs to obtain detection information from various target objects, including but not limited to a stationary vehicle and a moving vehicle. The sensor module 210 also needs to obtain detection information of a plurality of types, including but is not limited to a speed and an acceleration of the target object, a relative distance between the target object and the ego vehicle, and a specific orientation of the target object. Therefore, performance of the sensor module 210 is critical to identification of the ambient environment of the ego vehicle.

It can be understood that different types of sensors have different features, and advantages and disadvantages. For example, a lidar uses laser beams to locate, so its positioning accuracy is high, has good depth information, and can measure a distance and a speed, but the lidar cannot detect long distances. Although a millimeter-wave radar has good range and speed measurement precision, but has a poor classification effect. A wheel speed sensor can obtain a wheel speed, and further obtain speed information of the ego vehicle. The sensor module 210 may combine and use different sensors to achieve better performance.

In this embodiment of this application, the sensor module 210 may include but is not limited to a vision sensor, a millimeter-wave radar, a lidar, and a wheel speed sensor.

S420: Trigger intelligent driving when the detection information is normal.

Specifically, when the detection information obtained by the sensor module 210 is normal, the sensor module 210 transmits the detection information to the fusion control module 220, and the fusion control module 220 processes the detection information to determine to trigger intelligent driving control. It should be noted that the detection information is normal includes that the acceleration that is of the target vehicle and that is obtained through the detection information is greater than a first threshold, that is, includes that the target vehicle does not decelerate sharply. The first threshold is a negative value, and is used to determine whether the target vehicle performs a sharp deceleration operation. The first threshold is set by development personnel based on an actual situation. This is not limited in this application.

In addition, the intelligent driving includes but is not limited to an ACC system. The ACC system may travel at a speed set by a driver, and may further implement functions of maintaining a preset vehicle following distance and automatically accelerating and decelerating as the distance changes.

For example, in a single-lane scenario, the sensor module 210 obtains detection information of a vehicle ahead (vehicle B) after an ego vehicle (vehicle A) is started. The detection information includes that a speed of the vehicle ahead (vehicle B) is 40 km/h, an acceleration is 0, and a relative distance between the vehicle ahead (vehicle B) and the ego vehicle (vehicle A) is 300 m. The sensor module 210 transmits the obtained detection information to the fusion control module 220. The fusion control module 220 analyzes the received detection information, and finds that the vehicle ahead (vehicle B) is traveling at a constant speed, and the detection information is normal. In this case, the fusion control module 220 prompts a driver to trigger a full speed ACC system, and determines that a vehicle following speed is 50 km/h. If a preset vehicle following distance is 150 m, after the driver triggers the full-speed ACC system, the ego vehicle (vehicle A) automatically accelerates to 50 km/h and keeps a vehicle following distance of 150 m from the vehicle ahead (vehicle B).

S430: When the detection information includes that the acceleration of the target vehicle is less than a first threshold, perform collision analysis, determine a collision risk level, and make a control decision.

Specifically, when the detection information obtained by the sensor module 210 includes that the acceleration of the target vehicle is less than the first threshold, that is, the detection information includes that the target vehicle performs a sharp deceleration operation, the sensor module 210 transmits the detection information to the fusion control module 220, and simultaneously triggers the fusion control module 220 to perform collision analysis, so as to obtain a collision analysis result, determine the collision risk level based on the collision analysis result, and make the control decision based on the collision risk level. The collision risk level includes a low risk, a medium risk and a high risk, and the control decision includes a low risk decision, a medium risk decision and a high risk decision.

Methods for a vehicle to perform collision analysis include but are not limited to the following methods.

(1) Vehicle Kinematics Method

The sensor module 210 obtains detection information of a target vehicle and related information such as a vehicle posture of an ego vehicle, and transmits the information to the fusion control module 220. The fusion control module 220 calculates a collision moment based on the received information. The detection information of the target vehicle includes a speed and an acceleration of the target vehicle, and a relative distance between the target vehicle and the ego vehicle, and the related information of the ego vehicle includes a speed and an acceleration of the ego vehicle. A kinematic model of the vehicle may include but is not limited to a constant velocity (CV) model, a constant acceleration (CA) model, a constant turn rate and velocity (CTRV) model, a constant turn rate and acceleration (a constant steering angle and velocity (and a constant curvature and acceleration (CCA) model. The corresponding collision moment may be obtained by using these vehicle kinematics models based on the obtained information of the target vehicle and the ego vehicle.

A collision risk determining manner may be described as follows: The collision moment is compared with a preset moment. When a ratio of the collision moment to the preset moment is less than or equal to a first relative ratio, the collision risk level is a low risk; or when a ratio of the collision moment to the preset moment is greater than the first relative ratio and is not greater than a second relative ratio, the collision risk level is a medium risk; or when the ratio of the collision moment to the preset moment is greater than the second relative ratio, the collision risk level is a high risk.

It should be noted that the preset moment is determined based on historical data analysis and a situation of the actuator of the ego vehicle.

It may be understood that the first relative ratio and the second relative ratio are set by research and development personnel based on an actual situation. This is not limited in this application.

(2) Direct Image Detection Method

A vehicle may obtain target information in an ambient environment by using the sensor module 210, and in particular, obtain an image and/or a video of the ambient environment by using the vision sensor in the sensor module 210. The sensor module 210 detects the ambient environment, obtains detection information of a target vehicle, and performs positioning and category classification on a vehicle target that appears in the image, to obtain a classification result and a minimum distance to a bounding box of the target vehicle. An image detection system and a neural network system may be included in the sensor module 210. Then, the corresponding detection information is transmitted to the fusion control module 220, and the fusion control module 220 may perform collision risk analysis in combination with the information of the ego vehicle.

A collision risk determining manner may be described as follows: The minimum distance between bounding boxes of the vehicles is compared with a safety distance. When a ratio of the minimum distance between the bounding boxes of the vehicles to the safety distance is less than or equal to a third relative ratio, the collision risk level is a high risk; or when the ratio of the minimum distance between the bounding boxes of the vehicles to the safe distance is greater than the third relative ratio and is not greater than a fourth relative ratio, the collision risk level is a medium risk; or when the ratio of the minimum distance between the bounding boxes of the vehicles to the safe distance is greater than the fourth relative ratio, the collision risk level is a low risk.

It may be understood that the third relative ratio and the fourth relative ratio are set by research and development personnel based on an actual situation. This is not limited in this application.

It should be noted that the safety distance is determined based on historical data analysis and a situation of the actuator of the ego vehicle. A key to performing collision analysis by using the direct image detection method is to obtain a clear multi-directional image. Therefore, the vision sensor plays a very important role in the method. In this case, the sensor module 210 includes but is not limited to a vision sensor, an infrared sensor, and the like.

(3) Trajectory Intersection Method

The sensor module 210 obtains detection information in real time and transmits the detection information to the fusion control module 220. The detection information includes current locations and motion status information of an ego vehicle and a target vehicle. The fusion control module 220 predicts traveling tracks of the ego vehicle and the target vehicle, and determines whether the two tracks intersect. If the two tracks intersect, the fusion control module 220 calculates a time period in which the ego vehicle arrives at an intersection point of the two tracks from the current location and a time period in which the target vehicle arrives at the intersection point of the two tracks from the current location, and calculates an absolute value of a difference between the two time periods.

A collision risk determining manner may be described as follows: The absolute value of the time difference is compared with a preset moment. When a ratio of the absolute value of the time difference to the preset moment is less than or equal to a fifth relative ratio, the collision risk level is a high risk; or when a ratio of the absolute value of the time difference to the preset moment is greater than the fifth relative ratio and is not greater than a sixth relative ratio, the collision risk level is a medium risk; or when a ratio of the absolute value of the time difference to the preset moment is greater than the sixth relative ratio, the collision risk level is a low risk.

Figure 6A:
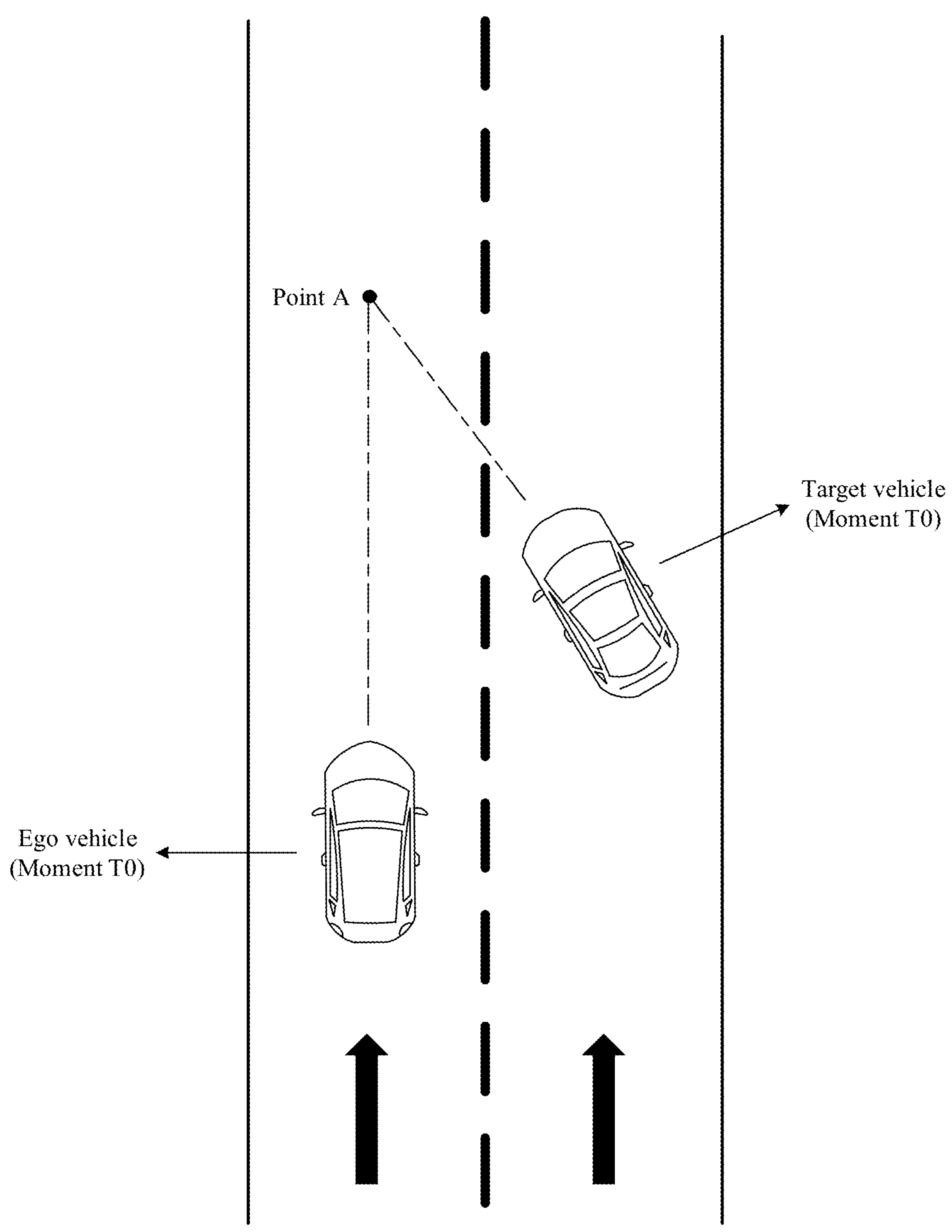
FIG. 6A is a schematic diagram of a scenario to which a collision analysis method is applicable according to an embodiment of this application.
Figure 6B:
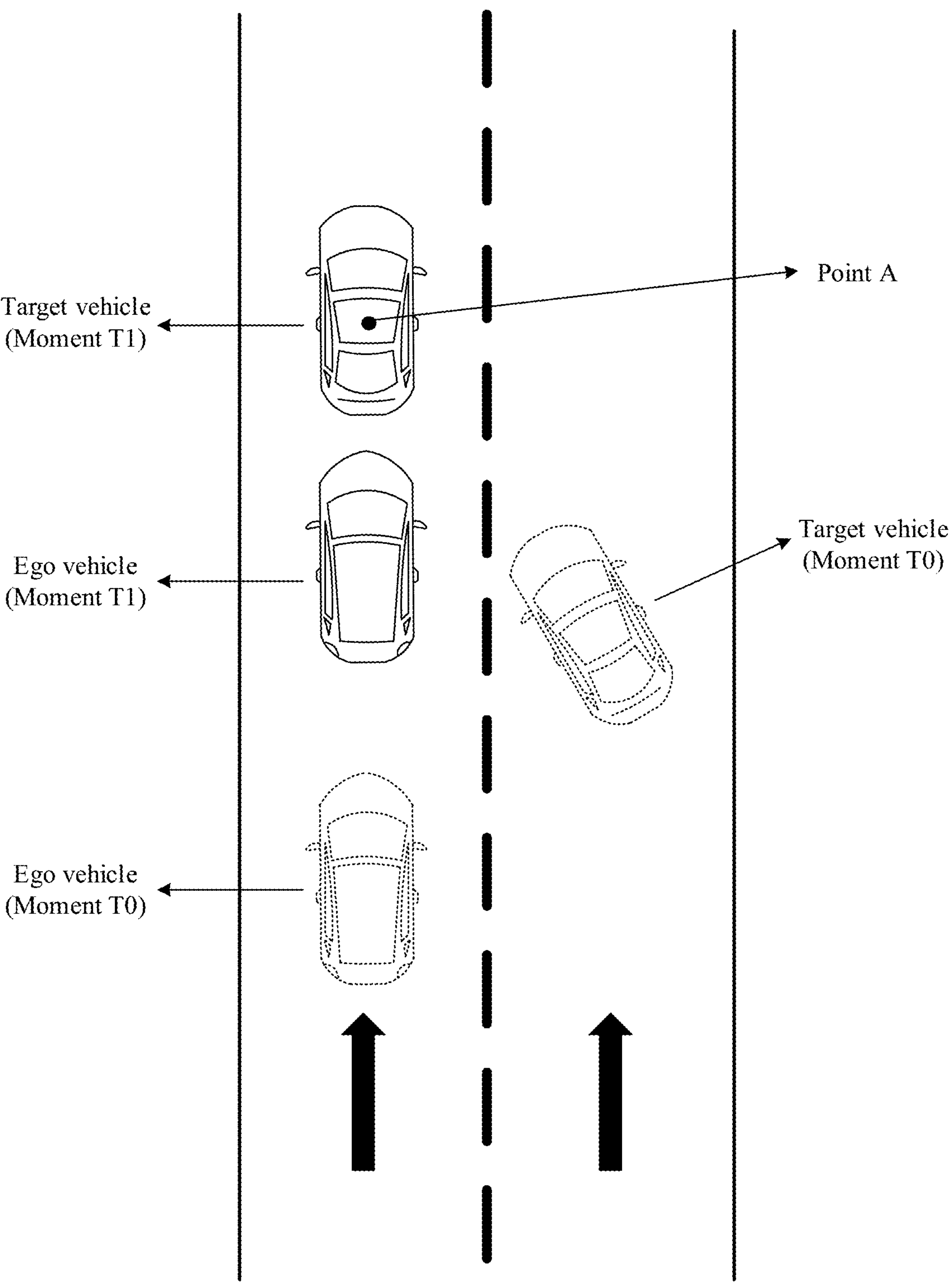
FIG. 6B is a schematic diagram of another scenario to which a collision analysis method is applicable according to an embodiment of this application.
Figure 6C:
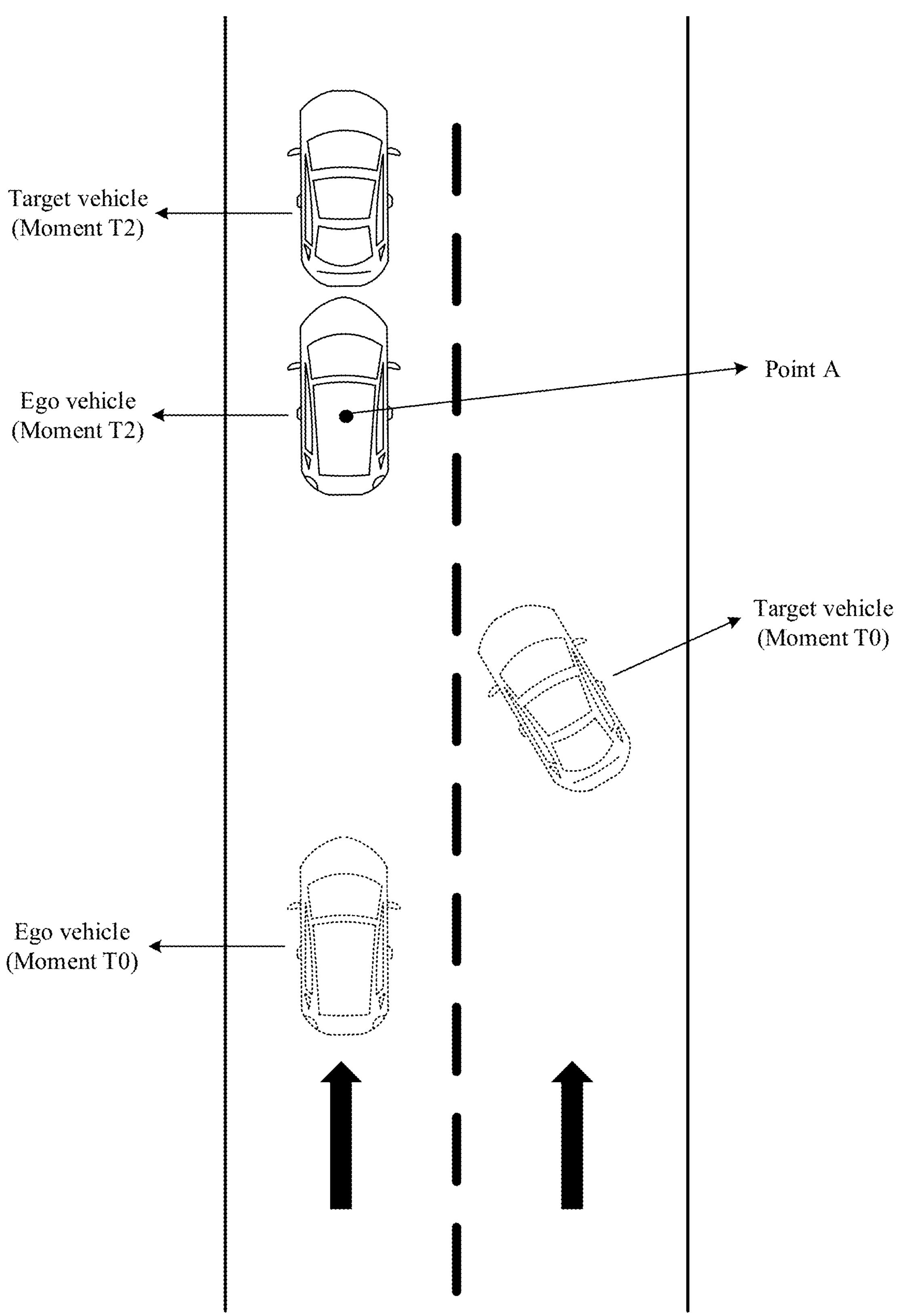
FIG. 6C is a schematic diagram of still another scenario to which a collision analysis method is applicable according to an embodiment of this application.

For example, FIG. 6A, FIG. 6B, and FIG. 6C show a scenario in which collision analysis is performed by using a trajectory intersection method. As shown in FIG. 6A, at a moment T0, the sensor module 210 of an ego vehicle obtains detection information, where the detection information includes related information of a target vehicle in a neighboring lane and related information of the ego vehicle. The related information of the target vehicle includes a relative distance between the target vehicle and the ego vehicle, and a location, a speed, and an acceleration of the target vehicle, and the related information of the ego vehicle includes a speed and an acceleration of the ego vehicle. The sensor module 210 transmits the obtained related information of the target vehicle to the fusion control module 220. The fusion control module 220 analyzes traveling tracks of the ego vehicle and the target vehicle based on the received detection information, and learns, through analysis, that the traveling track of the ego vehicle and the traveling track of the target vehicle intersect at a point A. Then, the fusion control module 220 calculates a time period required for the target vehicle to travel from the current location (the location at the moment T0) to the point A. As shown in FIG. 6B, it may be obtained through calculation that the target vehicle arrives at the point A at a moment T1. Therefore, the time period required for the target vehicle to travel from the current location to the point A is (T1−T0), but the ego vehicle does not reach the point A at this moment. Then, the fusion control module 220 calculates a time period required for the ego vehicle to travel from a location at the moment T0 to the point A. As shown in FIG. 6C, it can be obtained through calculation that the ego vehicle reaches the point A at a moment T2, so the time period required for the ego vehicle to travel from the current location to the point A is (T2−T0). It may be obtained that a time difference between the time period in which the ego vehicle travels from the current location (the location at the moment T0) to the intersection point of the two tracks and the time period in which the target vehicle travels from the current location (the location at the moment T0) to the intersection point of the two tracks is (T2−T1), and the time difference is compared with a preset moment T. If the fifth relative ratio is set to 0.4, and the sixth relative ratio is set to 0.8, when a ratio of (T2−T1) to the preset moment T is less than or equal to 0.4, the collision risk level is a high risk; or when a ratio of (T2−T1) to the preset moment T is greater than 0.4 and not greater than 0.8, the collision risk level is a medium risk; or when a ratio of (T2−T1) to the preset moment T is greater than 0.8, the collision risk level is a low risk.

It may be understood that the fifth relative ratio and the sixth relative ratio are set by research and development personnel based on an actual situation. This is not limited in this application.

It should be noted that the preset moment is determined based on historical data analysis and a situation of the actuator of the ego vehicle.

It should be noted that the foregoing three collision analysis methods are merely examples, and there are still many more collision analysis methods that are not described herein. The foregoing content should not be understood as a limitation on this application. In addition, during collision analysis, one collision analysis method may be used, or analysis may be performed with reference to a plurality of collision analysis methods, to determine a collision risk level based on analysis results of the plurality of collision analysis methods, and make a corresponding control decision. It may be understood that, if collision risk levels determined based on the analysis results of the plurality of collision analysis methods are different, a collision risk level representing a maximum risk degree is selected as the collision risk level of this collision analysis. For example, when collision analysis is performed in combination with the foregoing three collision analysis methods, the collision risk level obtained by using the vehicle kinematics method is a high risk, the collision risk level obtained by using the direct image detection method is medium risk, and the collision risk level obtained by using the trajectory intersection method is a low risk. Among the analysis results of the three collision analysis methods, the high risk represents the maximum risk degree, so the collision risk level obtained from collision analysis is determined as the high risk.

S440: When it is determined that there is a collision risk, transmit the control decision.

Specifically, after collision analysis is performed, the collision risk level is determined, and the control decision is made, the fusion control module 220 transmits the control decision to the reminding module 230.

It can be learned from the foregoing content that collision analysis is triggered only when the detection information is abnormal, for example, the target vehicle decelerates sharply. However, when the detection information is not always abnormal, a collision may not occur. For example, the target vehicle decelerates sharply and then accelerates sharply, and then reaches a stable speed. This situation may not affect safe driving. In this case, a result of collision analysis may be that there is no risk. When the result of collision analysis is that there is no risk, the collision risk level is not classified, and the control decision is not made.

S450: Remind the target vehicle.

Specifically, the reminding module 230 reminds the target vehicle based on the received control decision. The reminding module 230 may remind the target vehicle by controlling a sound and/or light, or may remind the target vehicle by sending a V2X message to the target vehicle.

Optionally, in a manner of reminding the target vehicle by controlling a sound and/or light, the sound may be a specific sound, and the light may alternatively be a specific light combination, for example, light flashing at a specific frequency or a specific light hardware composition. Alternatively, a combination of sounds, such as short whistles, and light may be used. It may be understood that, in a scenario where sounds are limited, use of a sound is reduced, and in this case, light is first selected.

Similarly, a V2X message may be directly sent to the target vehicle or a V2X message may be sent to the target vehicle by using an RSU to remind the target vehicle. The V2X message may include but is not limited to a collision analysis method, a collision risk level, and a moment at which a collision may occur. Optionally, the V2X message may be displayed on a V2X-related screen of the target vehicle, or may be directly played by using a speaker after successful transmission, or a combination of the two methods may be used to remind the target vehicle. For example, after the collision risk level is determined, the collision risk level is transmitted to the target vehicle, and the collision risk level is broadcast through an in-vehicle speaker.

Different reminding methods can be used for different collision risks. For example, in a reminding method of using light, light flashing at a higher frequency is used for reminding in a scenario with a high collision risk, and light flashing at a lower frequency is used for reminding in a scenario with a low collision risk.

It should be noted that different reminding methods may be used for different received control decisions. For example, in a reminding method of using light, light flashing at a higher frequency is used for reminding in a scenario with a high collision risk, and light flashing at a lower frequency is used for reminding in a scenario with a low collision risk. In a reminding method of using a V2X message, content of V2X messages transmitted in different collision risk scenarios is different. Therefore, content displayed on a V2X-related screen and/or content played by a speaker are different.

In addition, the target vehicle takes a corresponding measure after receiving a reminder from the ego vehicle. When the information received by the target vehicle indicates that the collision risk level is a high risk, the target vehicle performs braking processing, and sends a command for ensuring safety of the driver of the target vehicle. The command includes but is not limited to fastening a seat belt and adjusting a vehicle head cushion.

It should be noted that, in an entire vehicle reminding process, the sensor module 210 of the ego vehicle continuously obtains detection information to determine an ambient environment and a status of the target vehicle. Therefore, after the target vehicle is reminded, if information obtained by the sensor module 210 indicates that the risk is eliminated, the reminding module 230 of the ego vehicle sends information that the risk is eliminated to the target vehicle.

The method in embodiments of this application is described in detail above. For ease of better implementing the solutions in embodiments of this application, correspondingly, a related device used to cooperate in implementing the solutions is further provided below.

Figure 7:
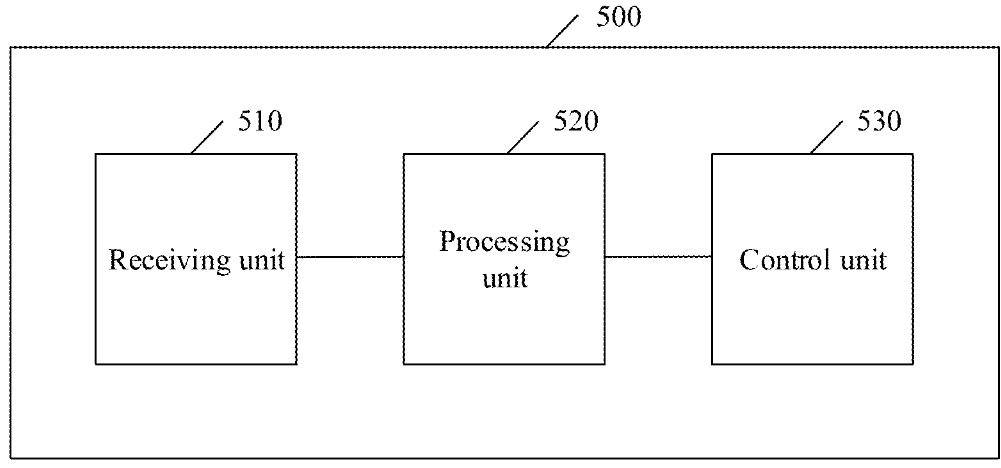
FIG. 7 is a schematic diagram of a structure of another vehicle reminding device according to an embodiment of this application.

As shown in FIG. 7, this application provides another vehicle reminding device. The vehicle reminding device may be the ego vehicle in FIG. 1A and FIG. 1B, or may be the intelligent vehicle in FIG. 4, and may be further configured to perform the foregoing vehicle reminding method. Functional unit division of the vehicle reminding device is not limited in this application. Units in the vehicle reminding device may be added, deleted, or combined as needed. FIG. 7 provides an example of functional unit division.

The vehicle reminding device 500 includes a receiving unit 510, a processing unit 520, and a control unit 530.

The receiving unit 510 is configured to receive detection information, where the detection information includes related information of a target vehicle and related information of an ego vehicle that are collected by a sensor, and transmit the received detection information to the processing unit 520.

The processing unit 520 is configured to process the detection information sent by the receiving unit 510, perform collision analysis based on the detection information, make a control decision, and send the control decision to the control unit 530.

The control unit 530 is configured to remind the target vehicle based on the control decision made by the processing unit 520.

The three units may transmit data to each other by using a communication path. It should be understood that the units included in the vehicle reminding device 500 may be software units, or may be hardware units, or some units are software units and some units are hardware units.

In addition, the receiving unit 510 of the vehicle reminding device 500 actually performs operations performed by the sensor module 210, the processing unit 520 actually performs operations performed by the fusion control module 220, and the control unit 530 actually performs operations performed by the reminding module 230.

Figure 8:
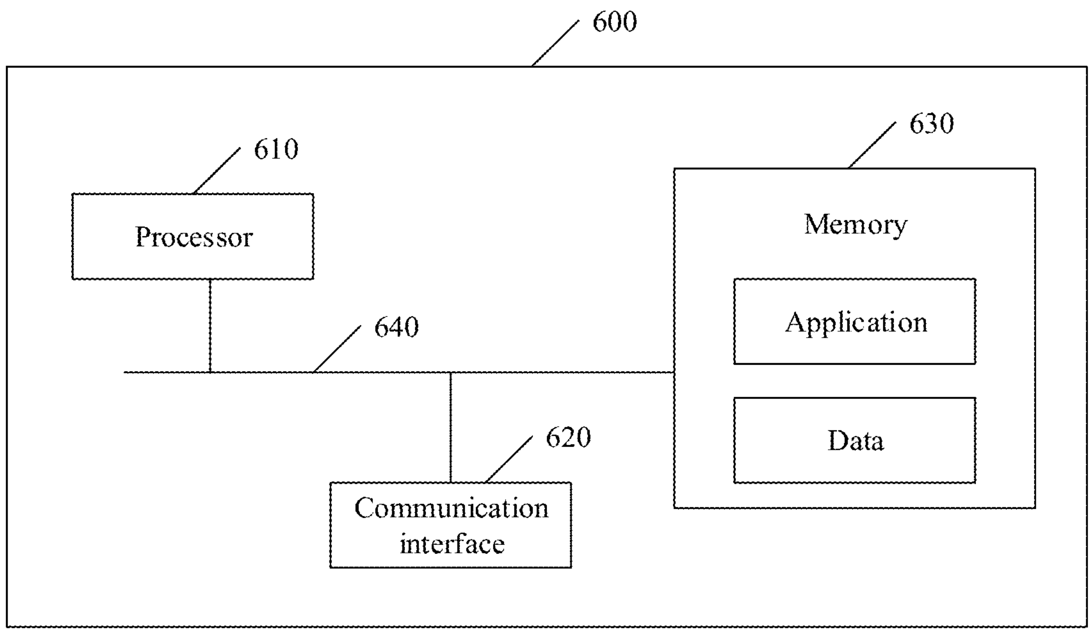
FIG. 8 is a schematic diagram of a structure of a computing device according to an embodiment of this application.

FIG. 8 is a schematic diagram of a structure of a computing device according to an embodiment of this application. As shown in FIG. 8, the computing device 600 includes a processor 610, a communication interface 620, and a memory 630. The processor 610, the communication interface 620, and the memory 630 are connected to each other through an internal bus 640.

The computing device 600 may be the vehicle reminding device in FIG. 2, or may be the vehicle reminding device in FIG. 7. Functions performed by the vehicle reminding device in FIG. 2 and the vehicle reminding device in FIG. 7 are actually performed by the processor 610 of the vehicle reminding device.

The processor 610 may include one or more general-purpose processors, for example, a central processing unit (CPU), or a combination of a CPU and a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The bus 640 may be a peripheral component interconnect (PCI) bus, an extended industry standard architecture (EISA) bus, or the like. The bus 640 may be classified into an address bus, a data bus, a control bus, and the like. For ease of representation, only one thick line is used to represent the bus in FIG. 8, but this does not mean that there is only one bus or only one type of bus.

The memory 630 may include a volatile memory such as a random access memory (RAM); or the memory 630 may include a non-volatile memory such as a read-only memory (ROM), a flash memory, a hard disk drive (HDD), or a solid-state drive (SSD); or the memory 630 may include a combination of the foregoing types of memories. Program code may be used to implement a functional unit shown in the vehicle reminding device 500, or is used to implement method operations in which the vehicle reminding device is used as an execution body in the method embodiment shown in FIG. 5.

An embodiment of this application further provides a computer-readable storage medium. The computer-readable storage medium stores a computer program. When the program is executed by a processor, some or all of the operations recorded in any one of the foregoing method embodiments can be implemented, and functions of any functional unit described in FIG. 7 can be implemented.

An embodiment of this application further provides a computer program product. When the computer program product is run on a computer or a processor, the computer or the processor is enabled to perform one or more operations in any one of the foregoing methods. When the foregoing modules in the device are implemented in a form of a software functional unit and sold or used as an independent product, the modules may be stored in the computer-readable storage medium.

This application further provides an intelligent vehicle. The intelligent vehicle includes the computing device shown in FIG. 8. The computing device is configured to perform the operation operations of the method in FIG. 5.

In the foregoing embodiments, the description of each embodiment has respective focuses, or a part that is not described in detail in an embodiment, refer to related descriptions in other embodiments.

It should further be understood that "first", "second", "third", "fourth", and various numbers in this specification are merely used for differentiation for ease of description, and are not construed as any limitation on the scope of this application.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate components may or may not be physically separate, and parts displayed as units may or may not be physical units, may be located in one place, or may be distributed on a plurality of network units. Some or all of the units may be selected based on actual requirements to achieve the objectives of the solutions of embodiments.

In addition, function units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

A sequence of the operations of the method in embodiments of this application may be adjusted, combined, or removed based on an actual requirement.

The modules in the apparatus in embodiments of this application may be combined, divided, and deleted based on an actual requirement.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A vehicle reminding method, wherein the method comprises:

obtaining, by a processor, detection information, wherein the detection information comprises related information that is of a target vehicle and that is collected by a sensor, wherein the related information of the target vehicle comprises an acceleration value of the target vehicle;

determining, by the processor, whether the acceleration value of the target vehicle is less than a first threshold before performing collision analysis;

in response to determining that the acceleration value of the target vehicle is less than the first threshold, performing, by the processor, the collision analysis based on the detection information and the related information of the target vehicle;

determining a collision risk level, wherein the collision risk level is one of a low risk, a medium risk, or a high risk; and reminding, by the processor, the target vehicle of a collision risk, determined based on the collision analysis, by sending a message to the target vehicle and controlling a sound and/or light when the collision risk level is determined, including:

generating, a combination of the sound and the light based on the collision analysis to remind the target vehicle, including:

reducing a use of the sound in an environment where the sound is limited, prioritizing a use of the light in the environment where the sound is limited;

generating a light flashing at a higher frequency in a scenario with a high collision risk; and generating the light flashing at a lower frequency in a scenario with a low collision risk.

2. The method according to claim 1, wherein the detection information further comprises related information that is of an ego vehicle and that is collected by the sensor.

3. The method according to claim 1, wherein the reminding the target vehicle of the collision risk comprises:

sending, by the processor, a vehicle to everything (V2X) message to the target vehicle to remind the target vehicle of a collision risk level.

4. A vehicle reminding apparatus, comprising:

one or more processors, and a memory coupled to the one or more processors and storing program instructions, which, when executed by the one or more processors, cause the apparatus to:

receive detection information, wherein the detection information comprises related information that is of a target vehicle and that is collected by a sensor, wherein the related information of the target vehicle comprises an acceleration value of the target vehicle;

process the detection information;

determine whether the acceleration value of the target vehicle is less than a first threshold before performing collision analysis;

in response to determining that the acceleration value of the target vehicle is less than the first threshold, perform the collision analysis based on the detection information and the related information of the target vehicle;

determine a collision risk level after performing collision analysis, wherein the collision risk level is one of a low risk, a medium risk, or a high risk; and remind the target vehicle of a potential risk based on the collision analysis by sending a message to the target vehicle and controlling a sound and/or light when the collision risk level is determined, including:

generating a combination of the sound and the light based on the collision analysis to remind the target vehicle, including:

reducing a use of the sound in an environment where the sound is limited, prioritizing a use of the light in the environment where the sound is limited;

generating a light flashing at a higher frequency in a scenario with a high collision risk; and generating the light flashing at a lower frequency in a scenario with a low collision risk.

5. The apparatus according to claim 4, wherein the program instructions further cause the apparatus to receive related information of an ego vehicle.

6. The apparatus according to claim 4, wherein the program instructions further cause the apparatus to:

send a vehicle to everything (V2X) message to the target vehicle to remind the target vehicle when the collision risk level is determined.

7. A non-transitory computer-readable medium storing program instructions, which, when executed by one or more processors of a vehicle reminding apparatus, cause the apparatus to:

receive detection information, wherein the detection information comprises related information that is of a target vehicle and that is collected by a sensor, wherein the related information of the target vehicle comprises an acceleration value of the target vehicle;

process the detection information;

determine whether the acceleration value of the target vehicle is less than a first threshold before performing collision analysis;

in response to determining that the acceleration value of the target vehicle is less than the first threshold, perform the collision analysis based on the detection information and the related information of the target vehicle;

determine a collision risk level after performing collision analysis, wherein the collision risk level is one of a low risk, a medium risk, or a high risk; and remind the target vehicle of a potential risk based on the collision analysis by sending a message to the target vehicle and controlling a sound and/or light when the collision risk level is determined, including:

generating a combination of the sound and the light based on the collision analysis to remind the target vehicle, including:

reducing a use of the sound in an environment where the sound is limited, prioritizing a use of the light in the environment where the sound is limited;

generating a light flashing at a higher frequency in a scenario with a high collision risk; and generating the light flashing at a lower frequency in a scenario with a low collision risk.

8. The non-transitory computer-readable medium according to claim 7, wherein the program instructions further cause the apparatus to receive related information of an ego vehicle.

9. The non-transitory computer-readable medium according to claim 7, wherein the program instructions further cause the apparatus to:

send a vehicle to everything (V2X) message to the target vehicle to remind the target vehicle when the collision risk level is determined.

* * * * *